Jan. 20, 1953     E. D. CLIFTON, SR     2,625,691
FLEXIBLE FLUSH TANK BALL SHAFT
Filed March 16, 1951
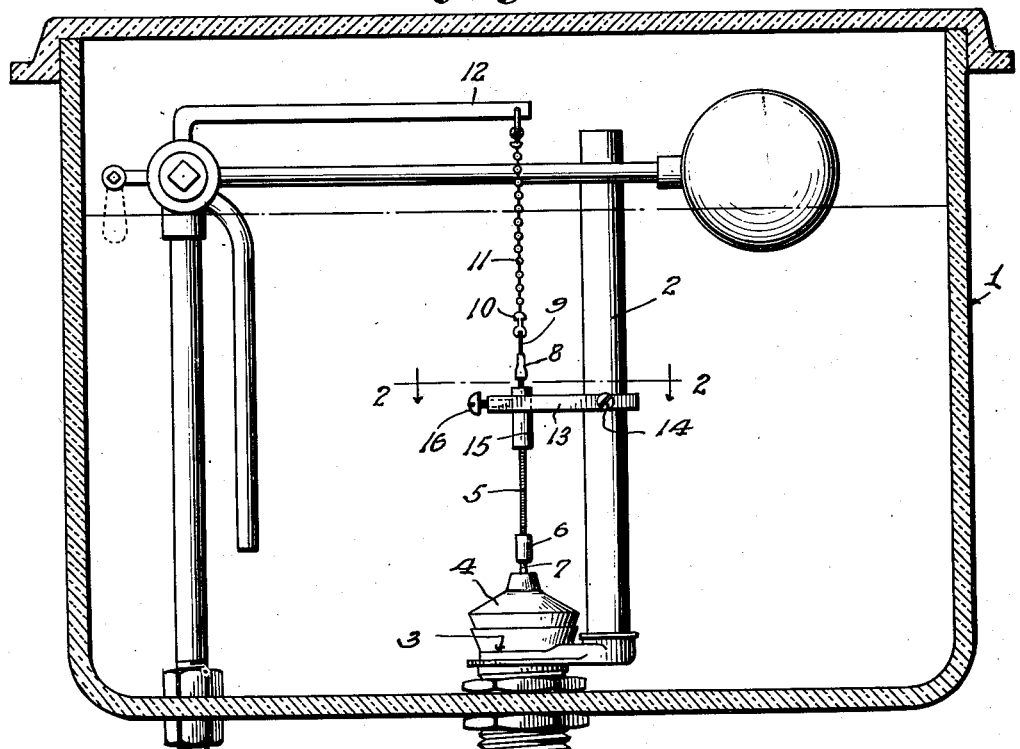
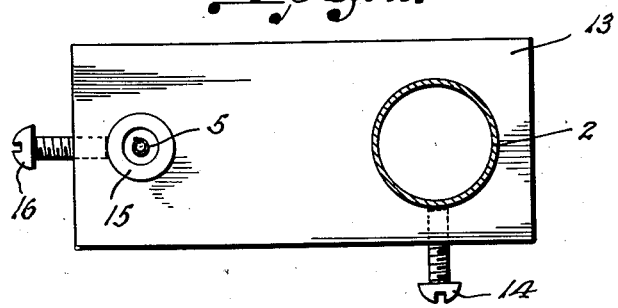
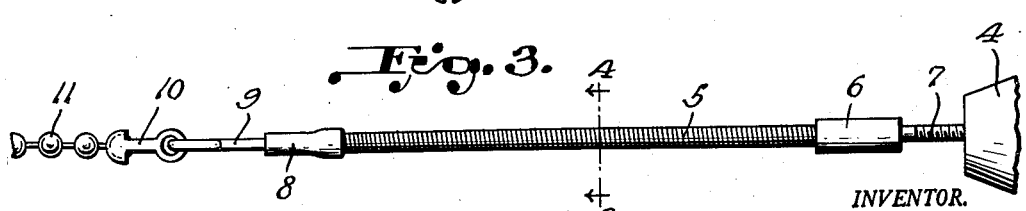
INVENTOR.
Edward D. Clifton, Sr.
BY
ATTORNEYS.

Patented Jan. 20, 1953

2,625,691

UNITED STATES PATENT OFFICE 2,625,691

FLEXIBLE FLUSH TANK BALL SHAFT

Edward D. Clifton, Sr., San Antonio, Tex.

Application March 16, 1951, Serial No. 215,981

1 Claim. (Cl. 4—57)

This invention relates to certain improvements in flush tanks.

An object of this invention is the production of efficient means whereby the ball valve of a flush tank can be operated with excellent results.

Another object of the invention is to simplify the construction of a ball shaft for use in a flush tank whereby the tank will operate in an efficient manner, and the structure of my invention will practically eliminate wear and repair expenses.

A still further object of the invention is the provision of a coil spring shaft which can be used with excellent results, in showing at all times admirable results that are not obtainable by the common or old type of a shaft that is connected to the ball valve.

Another object of the invention is the construction of a flush tank in which an efficient form of a bracket is used to assemble the flexible or coil spring shaft with the other elements of the flush tank.

With the foregoing and other objects in view, this invention comprises certain novel constructions, combinations, and arrangements of parts as will be hereinafter fully described, illustrated in the accompanying drawings, and more particularly pointed out in the appended claim.

In the drawings:

Figure 1 is a vertical sectional view of a flush tank showing in side elevation my invention in the flush tank.

Figure 2 is an enlarged sectional view taken on line 2—2, Fig. 1, and looking in the direction of the arrows.

Figure 3 is a view in side elevation of the coil spring shaft and its cooperating parts.

Figure 4 is an enlarged sectional view taken on line 4—4, Fig. 3, and looking in the direction of the arrows.

Referring to the drawings in which the preferred embodiment of this invention is illustrated, 1 designates an ordinary tank in which is positioned an overflow pipe 2. A valve seat 3 is formed in tank 1 to which is applied the lower end of overflow pipe 2. An ordinary ball valve 4 is normally seated on the valve seat 3.

A compensating shaft 5 is preferably constructed from a coil spring whereby any bending of shaft 5 will not impair its efficiency or injure it in any way. The lower end of the flexible or coil spring shaft is integral with a solid coupling 6. Integral with coupling 6 is a threaded member 7. Said threaded member 7 is threaded into the ball valve 4. On the upper end of the coil spring shaft 5 is fixed a solid head 8. Secured to head 8 is a metal eye 9. Fastened to eye 9 is a chain coupling 10. Fastened to chain coupling 10 is a non-kinking chain 11. Suitably connected to the upper end of chain 11 is manually-operated means 12 for operating the ball valve 4 when it is desired to flush the tank.

A plate-like bracket 13 is slidably mounted on the overflow pipe 2 and is secured in a fixed position on said pipe by means of a set screw 14.

Near the outer end of the bracket 13 is a guiding sleeve 15. This guiding sleeve is secured in an adjusted position upon bracket 13 by means of set screw 16. The coil spring shaft 5 extends through guiding sleeve 15. The said shaft 5 is free to move while ball valve 4 is being raised, for discharging the liquid in tank 1, or after the ball valve has been raised, the flexible or coil spring shaft permits the ball valve to be readily seated.

By means of the foregoing invention the general and expensive difficulties and failures of functioning of the ordinary type of flush tanks will be eliminated and a long lived flush tank will be produced.

While I have described the preferred embodiment of the invention and illustrated the same in the accompanying drawings, certain minor changes or alterations may appear to one skilled in the art to which this invention relates during the extensive manufacture of the same, and I, therefore, reserve the right to make such changes or alterations as shall fairly fall within the scope of the appended claim.

What I claim is:

In a device of the class described, the combination with a tank, of a valve seat in said tank, a ball valve seated on said valve seat, a coil spring shaft provided on its lower end with a solid coupler, a threaded member attached to the lower end of said solid coupler, a solid head on the upper end of said coil spring shaft, an eye secured to said solid head, a chain coupler attached to said eye, a non-kinking chain attached to said coupler, and manually-operated means connected to said non-kinking chain, whereby the coil spring shaft may be operated.

EDWARD D. CLIFTON, Sr.

REFERENCES CITED

The following references are of record in the file of this patent:

UNITED STATES PATENTS

| Number | Name | Date |
|---|---|---|
| 422,961 | Morrison | Mar. 11, 1890 |
| 1,814,604 | Martindell | July 14, 1931 |
| 2,046,888 | Watt | July 7, 1936 |
| 2,483,011 | Hudson | Sept. 27, 1949 |